United States Patent
Uimonen et al.

(10) Patent No.: US 9,902,453 B2
(45) Date of Patent: Feb. 27, 2018

(54) LOCKING STRUCTURE

(71) Applicant: MOBILITY HOLDINGS, LIMITED, Causeway Bay (HK)

(72) Inventors: Joakim Uimonen, Causeway Bay (HK); Eric Yi-Hung Lin, Causeway Bay (HK)

(73) Assignee: MOBILITY HOLDINGS, LIMITED, Causeway Bay (HK)

( * ) Notice: Subject to any disclaimer, the term of this patent is extended or adjusted under 35 U.S.C. 154(b) by 42 days.

(21) Appl. No.: 15/258,291

(22) Filed: Sep. 7, 2016

(65) Prior Publication Data
US 2018/0001954 A1 Jan. 4, 2018

(30) Foreign Application Priority Data
Jul. 1, 2016 (CN) .................... 2016 2 0690884 U

(51) Int. Cl.
*B62K 15/00* (2006.01)

(52) U.S. Cl.
CPC .......... *B62K 15/006* (2013.01); *Y10T 292/20* (2015.04); *Y10T 403/32319* (2015.01)

(58) Field of Classification Search
CPC ... B62K 15/006; B62K 15/008; Y10T 292/20; Y10T 292/216; Y10T 292/49; Y10T 403/32319; Y10T 403/32336; Y10T 403/32352; Y10T 403/591; Y10T 403/599; Y10T 403/602; Y10T 403/608
See application file for complete search history.

(56) References Cited

U.S. PATENT DOCUMENTS

| | | | | |
|---|---|---|---|---|
| 4,429,891 A * | 2/1984 | Hon | ...... | B62K 15/006 280/278 |
| 4,433,852 A * | 2/1984 | Hon | ...... | B62K 15/006 280/272 |
| 4,448,435 A * | 5/1984 | Hon | ...... | B62K 15/006 280/278 |
| 5,364,201 A * | 11/1994 | LaBarre | ...... | F16C 7/00 16/326 |
| 5,440,948 A * | 8/1995 | Cheng | ...... | B62K 15/006 280/278 |
| 5,492,350 A * | 2/1996 | Pan | ...... | B62K 15/006 280/278 |
| 5,816,614 A * | 10/1998 | Kramer, Jr. | ...... | B62D 1/14 180/208 |

(Continued)

*Primary Examiner* — Joseph M Rocca
*Assistant Examiner* — Michael R Stabley
(74) *Attorney, Agent, or Firm* — Muncy, Geissler, Olds & Lowe, P.C.

(57) ABSTRACT

A locking structure is applied to a folding frame. The folding frame includes a first frame and a second frame. The first frame includes a first hole. The second frame includes a second hole. The second frame can rotate relative to the first frame to fasten to the first frame. The locking structure includes a case, a first pivoting axis, a second pivoting axis, a fastening column, a connecting column and a third pivoting axis. The case includes a top, a bottom and a container. The first pivoting axis is pivotally connected to the bottom and the first hole. The second pivoting axis is pivotally connected to the second hole. The second pivoting axis includes a fastening groove. The fastening column is located in the container. The connecting column includes a connecting column first end and a connecting column second end.

11 Claims, 7 Drawing Sheets

(56) References Cited

U.S. PATENT DOCUMENTS

| | | | | |
|---|---|---|---|---|
| 6,135,668 A * | 10/2000 | Lin | ................... | B62K 15/006 |
| | | | | 280/278 |
| 6,276,701 B1 * | 8/2001 | Chen | ................... | B62K 3/002 |
| | | | | 280/87.05 |
| 6,293,575 B1 * | 9/2001 | Burrows | ............ | B62K 15/006 |
| | | | | 280/278 |
| 6,371,235 B1 * | 4/2002 | Wisecarver | .......... | B62D 31/006 |
| | | | | 180/208 |
| 6,390,483 B1 * | 5/2002 | Hsu | .................. | B62K 3/002 |
| | | | | 280/87.041 |
| 6,883,814 B2 * | 4/2005 | Chuang | ................ | B62K 3/002 |
| | | | | 280/62 |
| 7,011,319 B2 * | 3/2006 | Lu | ....................... | B62K 3/002 |
| | | | | 280/87.041 |
| 7,419,171 B1 * | 9/2008 | Ka Ming | ............. | B62K 3/002 |
| | | | | 280/87.041 |
| 8,814,195 B2 * | 8/2014 | Beistegui Chirapozu | ........... | B62K 15/006 |
| | | | | 280/281.1 |
| 9,205,889 B2 * | 12/2015 | Paick | .................. | B62M 6/60 |
| 9,321,500 B2 * | 4/2016 | Wang | ................. | B62K 15/008 |
| 2009/0160150 A1 * | 6/2009 | Johnson | ............... | B62K 3/002 |
| | | | | 280/87.041 |
| 2014/0097594 A1 * | 4/2014 | Barchek | ................ | B62K 9/02 |
| | | | | 280/287 |
| 2015/0060176 A1 * | 3/2015 | Paick | .................. | B62M 6/60 |
| | | | | 180/208 |
| 2015/0084312 A1 * | 3/2015 | Schreuder | ............ | B62K 3/002 |
| | | | | 280/639 |
| 2016/0053518 A1 * | 2/2016 | Evans | ................. | E05B 83/243 |
| | | | | 292/336.3 |

* cited by examiner

LOCKING STRUCTURE

BACKGROUND OF THE INVENTION

1. Field of the Invention

The present invention relates to a locking structure; more particularly, the present invention relates to a locking structure which allows the frames of a folding bicycle to be combined stably and prevents the frames of a folding bicycle from being damaged by an external force.

2. Description of the Related Art

The folding bicycle is a special kind of bicycle which is popular with users. The folding bicycle can be folded by the user to occupy a small volume such that the folding bicycle is easy to carry or store. For example, the handle stem and the head tube of the bicycle of the prior art are combined stably, but the handle stem frame of the folding bicycle is designed to be pivotally connected to the head tube, and the bottom of the handle stem frame has a fastening hole for stably fastening to the head tube; whereby, the handle stem frame of the folding bicycle can be bent to be close to the front wheel, allowing the whole volume of the folding bicycle to be reduced. If the user needs to ride the folding bicycle, the user can restore the handle stem frame of the folding bicycle to the unbent position to be fastened on the head tube, and the user can use the fastening structure to stably combine the handle stem frame and the head tube; therefore, when the user rides the folding bicycle, the jolts and vibrations caused by an uneven road surface will not cause the combination of the handle stem frame and the head tube to become separated.

The fastening structure of the folding bicycle of the prior art is used for preventing the handle stem frame from being bent. The fastening structure has a main body and a fastening column. When the fastening column is fastened to the fastening hole of the bottom of the handle stem frame, the main body of the fastening structure will abut against the fastening position of the handle stem frame and the head tube to prevent the handle stem frame from being bent. However, when the user rides the folding bicycle, the fastening hole of the bottom of the handle stem frame, which is fastened to the fastening column, will continuously sustain external shocks when the bicycle travels on an uneven road surface. In the course of time, the fastening hole of the bottom of the handle stem frame may be broken. Generally, the fastening hole of the bottom of the handle stem frame is directly drilled into the handle stem frame; therefore, if the fastening hole is broken, the fastening hole cannot be repaired. If the handle stem frame cannot be repaired, then in order to continue using the folding bicycle, the user must purchase a new one, incurring great expense.

Therefore, there is a need to provide a new fastening structure applied to a folding bicycle that can prevent the frame of the folding bicycle from being damaged by an external force.

SUMMARY OF THE INVENTION

The object of the present invention is to provide a locking structure which allows the frames of a folding bicycle to be combined stably and prevents the frames of a folding bicycle from being damaged by an external force.

To achieve the abovementioned object, a locking structure of the present invention is applied to a folding frame. The folding frame includes a first frame and a second frame. The first frame is pivotally connected to the second frame. The first frame includes a first hole. The second frame includes a second hole. The second frame can rotate relative to the first frame to move to be fastened to the first frame. The locking structure includes a case, a first pivoting axis, a second pivoting axis, a fastening column, a connecting column and a third pivoting axis. The case includes a top, a bottom and a container. The first pivoting axis is pivotally connected to the bottom and the first hole. The second pivoting axis is pivotally connected to the second hole. The second pivoting axis includes a fastening groove. The fastening column is located in the container. The connecting column includes a connecting column first end and a connecting column second end. The connecting column first end is connected to the second pivoting axis. The third pivoting axis is connected to the connecting column second end and pivotally connected to the top. When the second frame moves to be fastened to the first frame, the movement of the second frame will cause the second pivoting axis to rotate and cause the case to move, allowing the fastening column to move to be adjacent to the fastening groove.

According to one embodiment of the present invention, the fastening column includes a fastening column first end, a fastening column second end and an inclined plane. The fastening column first end and fastening column second end are two opposite ends. The inclined plane is located on the fastening column first end.

According to one embodiment of the present invention, the locking structure further includes an elastic part. The elastic part is located in the container and connected to the fastening column second end. The elastic force of the elastic part pushes the fastening column to cause the fastening column to move away from the top.

According to one embodiment of the present invention, the second pivoting axis further includes an arc surface, and the fastening groove is located on the arc surface.

According to one embodiment of the present invention, when the second frame moves to be fastened to the first frame, the movement of the second frame will cause the second pivoting axis to rotate and cause the case to move such that the inclined plane moves to be adjacent to the fastening groove.

According to one embodiment of the present invention, when the inclined plane moves to be adjacent to the fastening groove, if the case rotates on the first pivoting axis and toward the second frame, the inclined plane will move along the arc surface.

According to one embodiment of the present invention, when the inclined plane moves along the arc surface and aligns with the fastening groove, the elastic force of the elastic part will push the fastening column such that the fastening column first end will move away from the top and enter the fastening groove, causing the fastening column to be fastened to the fastening groove.

According to one embodiment of the present invention, the locking structure further includes a pushing part. The case further includes a sliding groove. The pushing part passes through the sliding groove and is connected to the fastening column.

According to one embodiment of the present invention, the fastening column further includes a fastening hole. The pushing part further includes a protruding column, and the protruding column passes through the sliding groove and is connected to the fastening hole.

According to one embodiment of the present invention, the ratio of a diameter of the fastening column first end to a diameter of the fastening groove is between 1:1.2 and 1:1.25.

DETAILED DESCRIPTION OF THE PREFERRED EMBODIMENT

Figure 1:
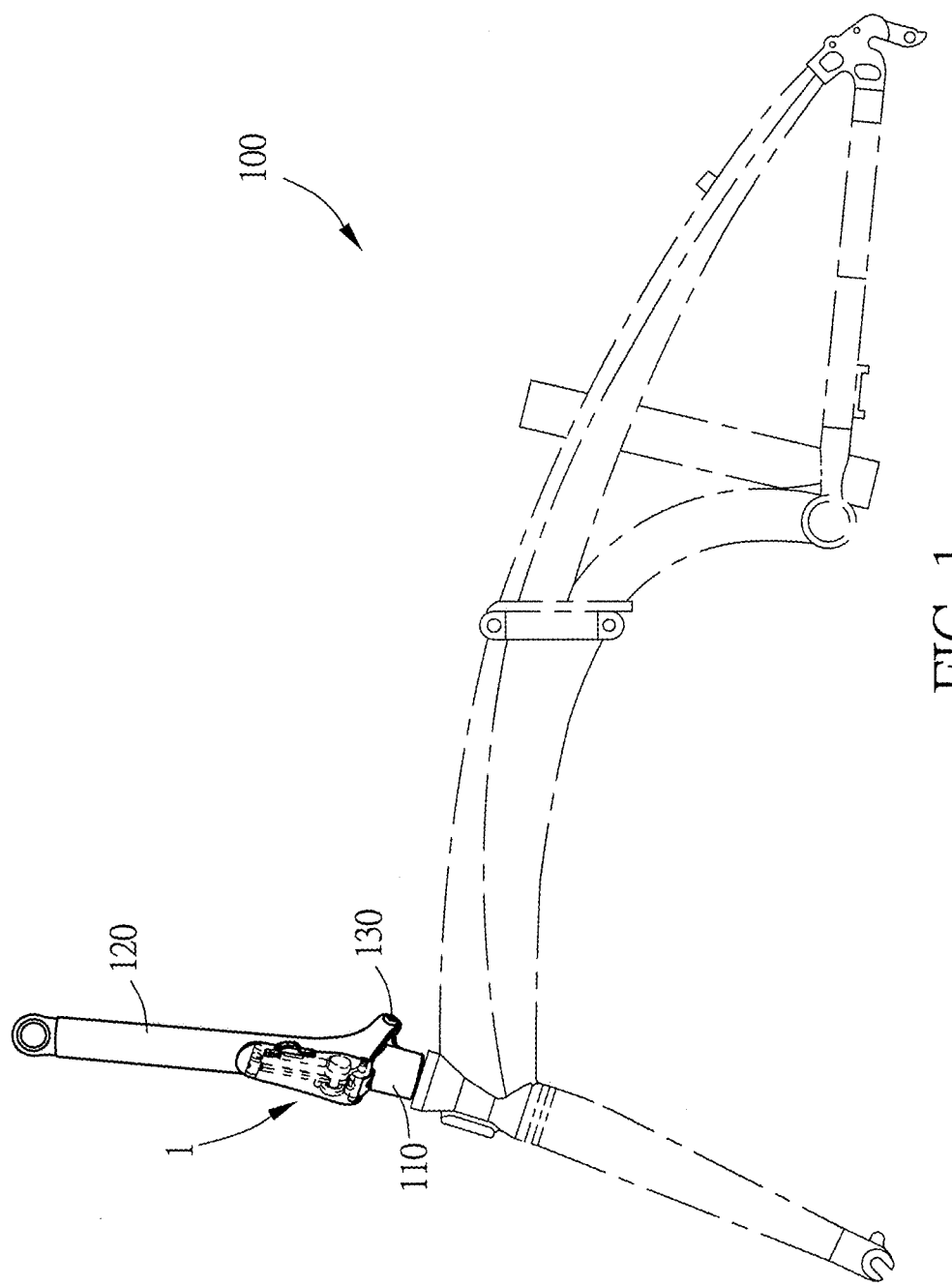
FIG. 1 illustrates a schematic drawing of the locking structure and the folding frame in one embodiment of the present invention.
Figure 2:
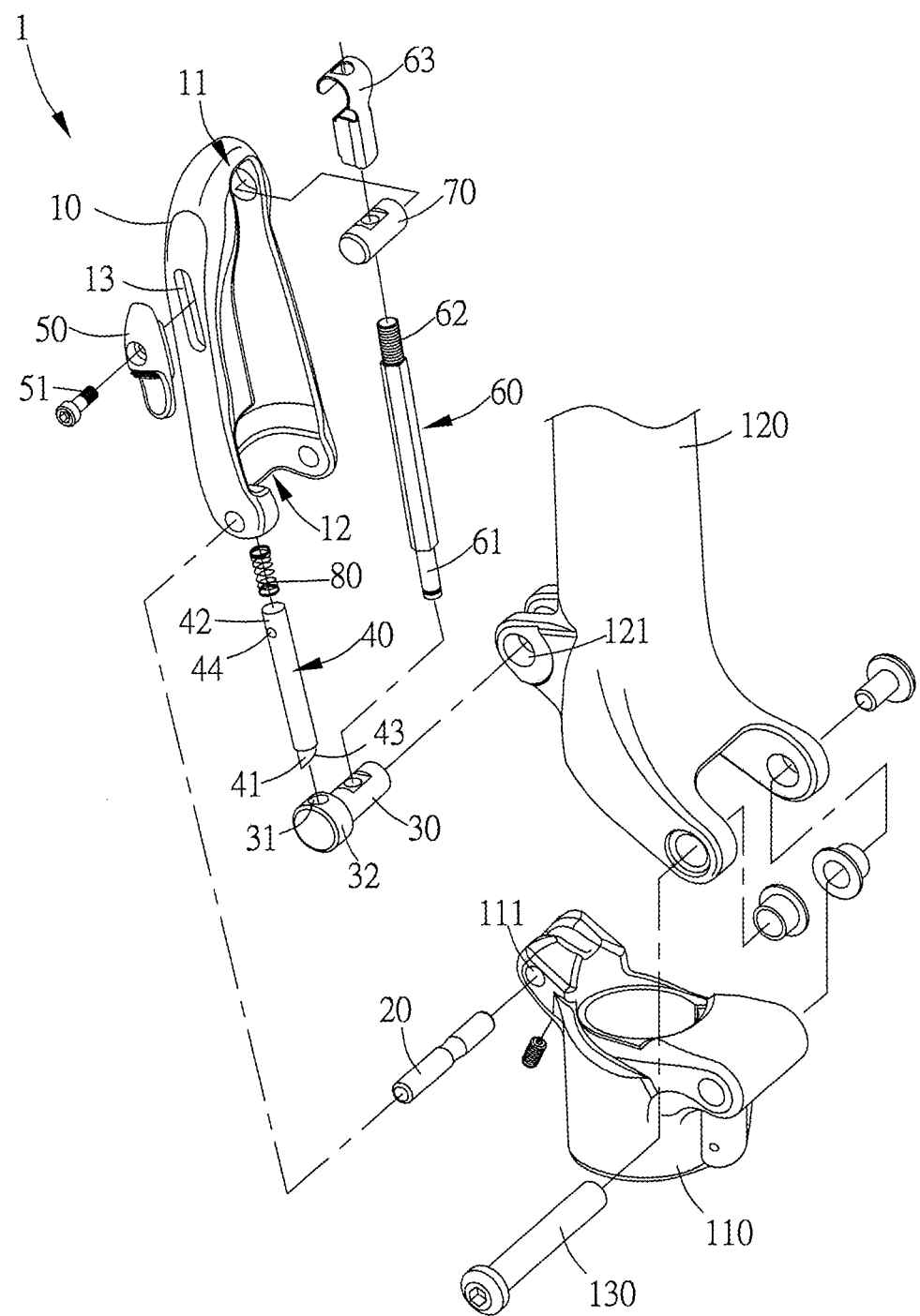
FIG. 2 illustrates an exploded drawing of the locking structure in one embodiment of the present invention.
Figure 3:
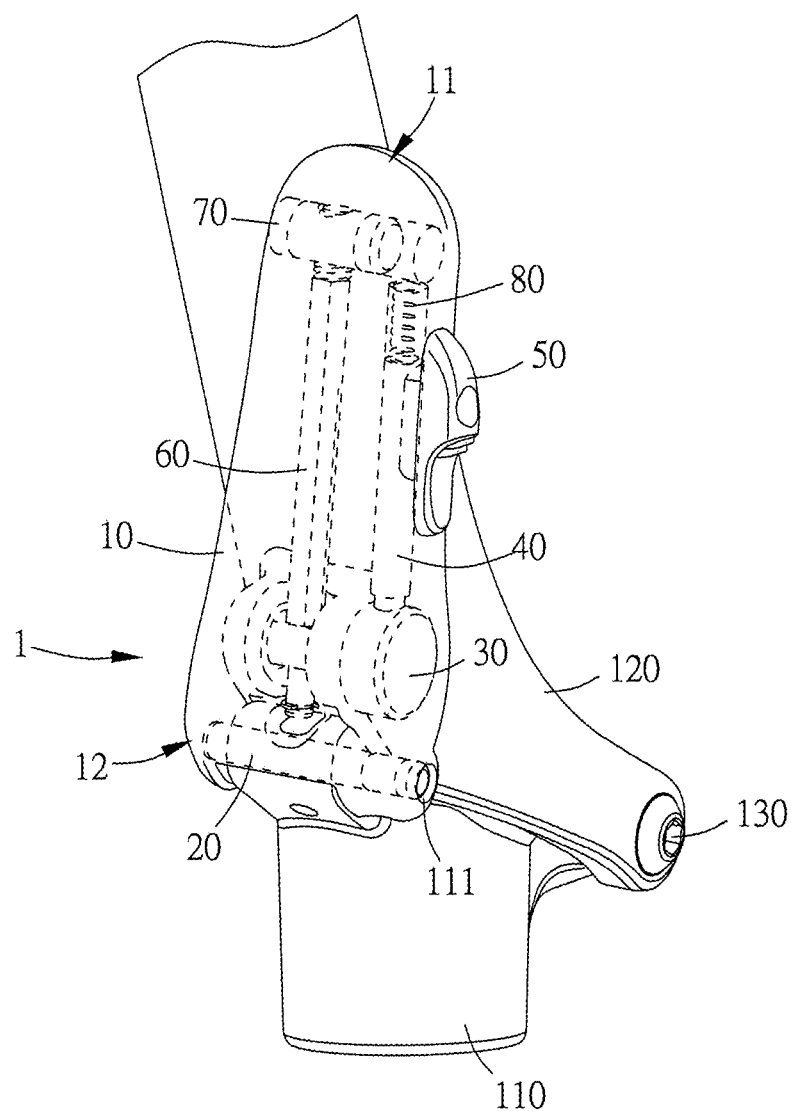
FIG. 3 illustrates a partial schematic drawing of the locking structure and the folding frame in one embodiment of the present invention.
Figure 4:
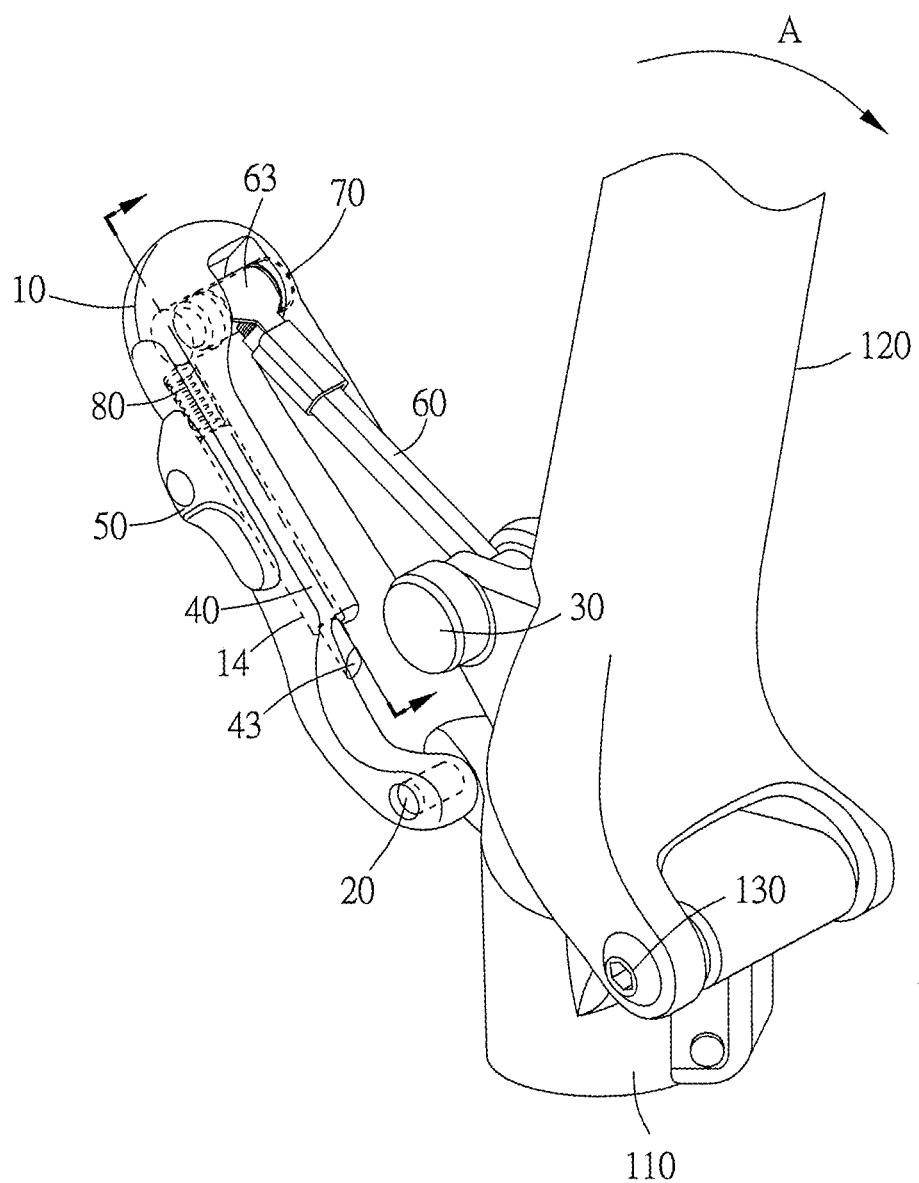
FIG. 4 illustrates a schematic drawing of the locking structure and the second frame not locked with the first frame in one embodiment of the present invention.
Figure 5:
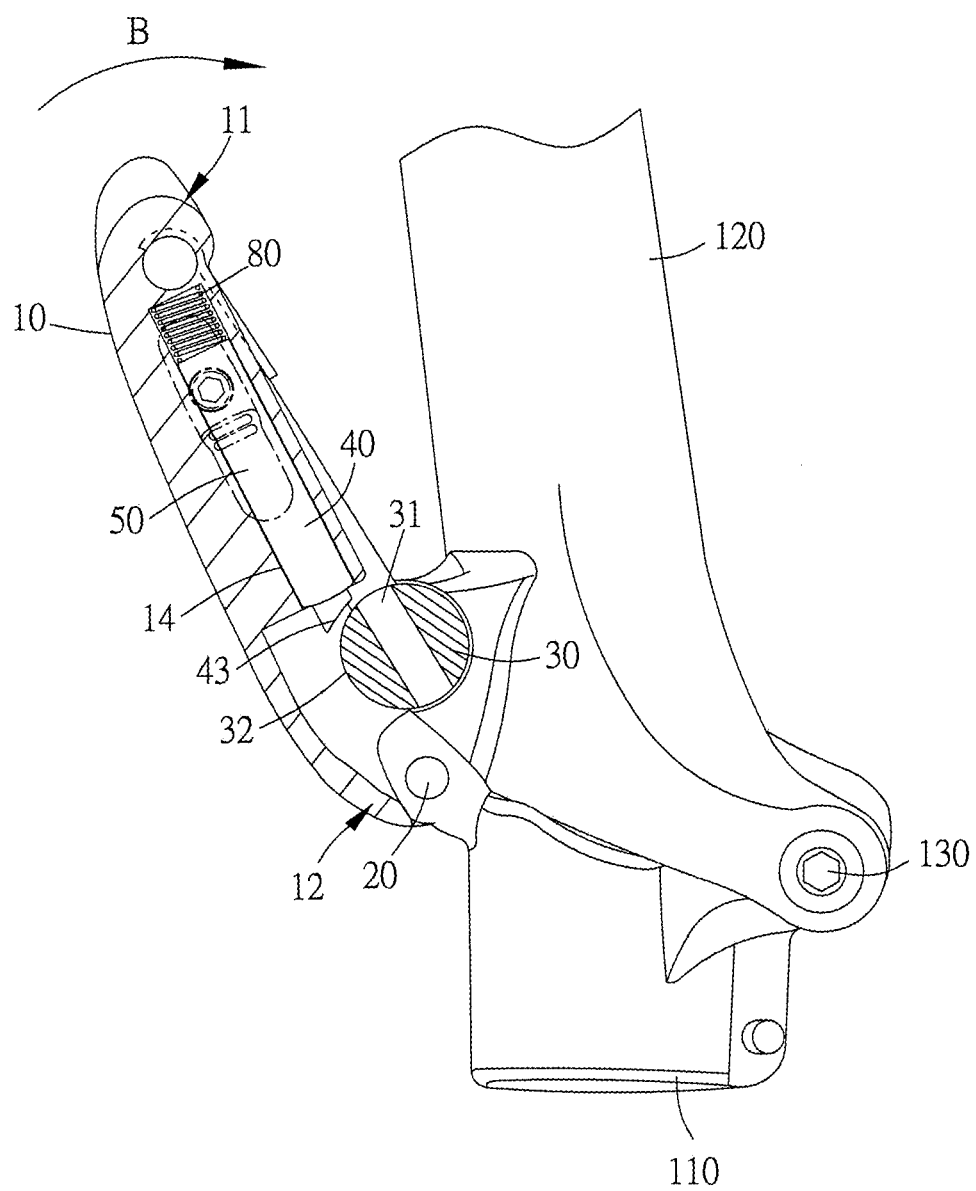
FIG. 5 illustrates a schematic drawing of the locking structure and the second frame locked with the first frame in one embodiment of the present invention.
Figure 6:
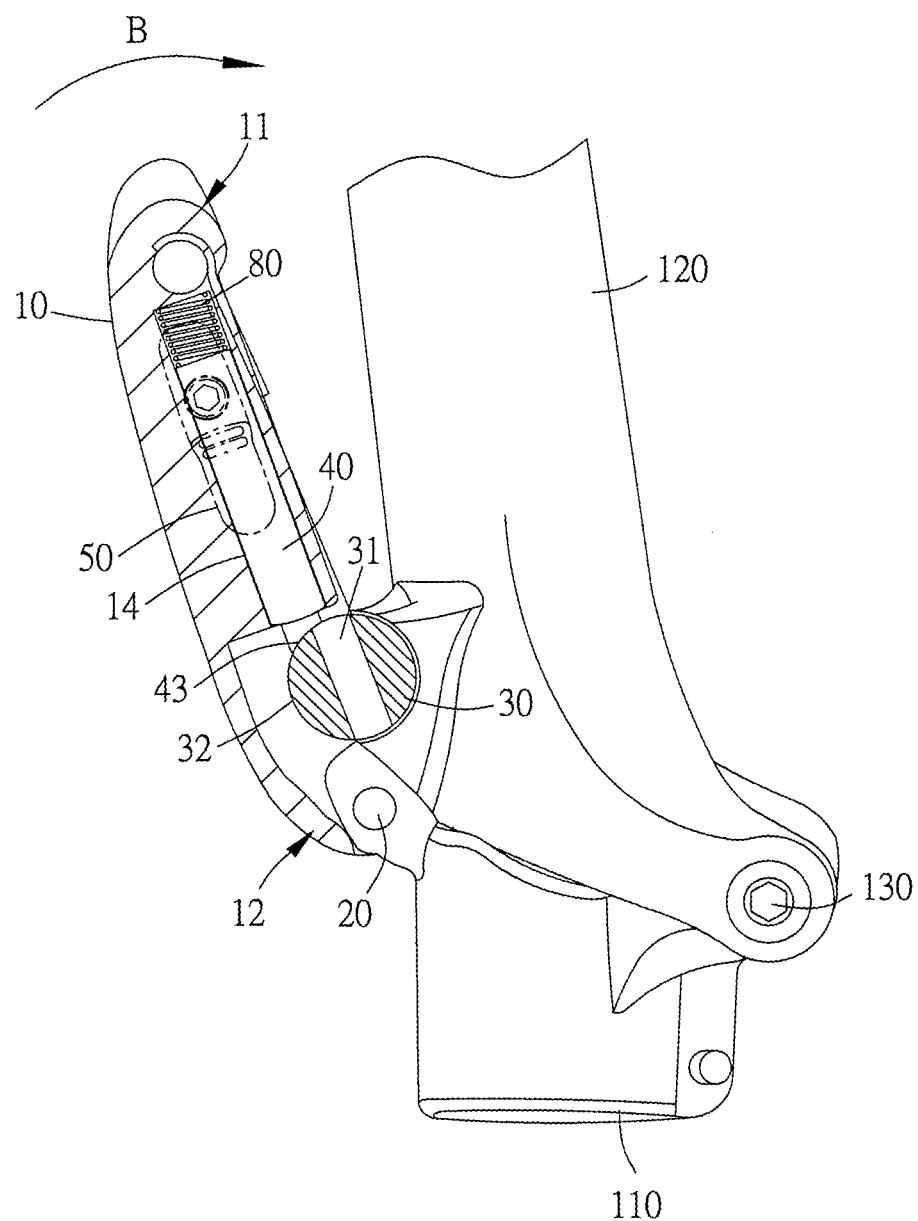
FIG. 6 illustrates a schematic drawing of the locking structure, which moves along the moving direction B, in one embodiment of the present invention.
Figure 7:
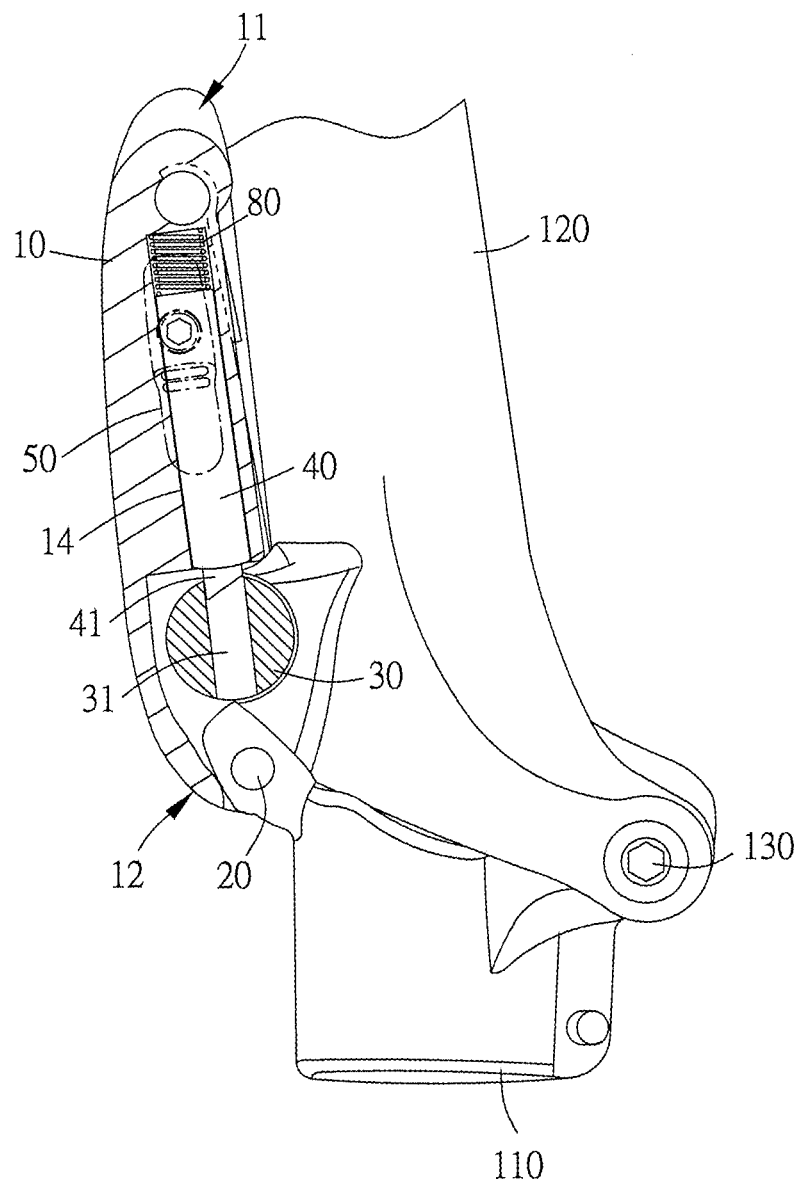
FIG. 7 illustrates a schematic drawing of the fastening column and the fastening groove fastened to each other in one embodiment of the present invention.

Please refer to FIG. 1 to FIG. 7 regarding the locking structure of the present invention. FIG. 1 illustrates a schematic drawing of the locking structure and the folding frame in one embodiment of the present invention. FIG. 2 illustrates an exploded drawing of the locking structure in one embodiment of the present invention. FIG. 3 illustrates a partial schematic drawing of the locking structure and the folding frame in one embodiment of the present invention. FIG. 4 illustrates a schematic drawing of the locking structure and the second frame not locked with the first frame in one embodiment of the present invention. FIG. 5 illustrates a schematic drawing of the locking structure and the second frame locked with the first frame in one embodiment of the present invention. FIG. 6 illustrates a schematic drawing of the locking structure, which moves along the moving direction B, in one embodiment of the present invention. FIG. 7 illustrates a schematic drawing of the fastening column and the fastening groove fastened to each other in one embodiment of the present invention.

In one embodiment of the present invention, as shown in FIG. 1 to FIG. 3, the locking structure 1 of the present invention is applied to a folding frame 100. The folding frame 100 is a bicycle frame of a folding bicycle. The folding frame 100 includes a first frame 110, a second frame 120 and a bicycle pivoting structure 130. The first frame 110 is a head tube of the folding bicycle and includes a first hole 111. The second frame 120 is a handle stem frame of the folding bicycle and includes a second hole 121. The bicycle pivoting structure 130 is a pivoting axis; the first frame 110 is pivotally connected to the second frame 120 via the bicycle pivoting structure 130. Via the bicycle pivoting structure 130, the second frame 120 can rotate relative to the first frame 110 to move to be fastened to the first frame 110. However, the type of the folding frame 100 is not limited to the bicycle frame of a folding bicycle; it can also be another frame structure with a folding function. The types of the first frame 110 and the second frame 120 are not limited to the head tube and the handle stem frame; they can also be other structures of the folding bicycle with a folding function.

As shown in FIG. 2 to FIG. 5, in one embodiment of the present invention, the locking structure 1 is used for stably fastening the second frame 120 and the first frame 110. The locking structure 1 includes a case 10, a first pivoting axis 20, a second pivoting axis 30, a fastening column 40, a pushing part 50, a connecting column 60, a third pivoting axis 70 and an elastic part 80. The case 10 is used for covering the first pivoting axis 20, the second pivoting axis 30, the fastening column 40, the connecting column 60, the third pivoting axis 70 and the elastic part 80 to prevent those components from being damaged by an external force; the case 10 is also used for being pressed by the user to move along the moving direction B or the opposite direction of the moving direction B. The case 10 includes a top 11, a bottom 12, a sliding groove 13 and a container 14. The top 11 and the bottom 12 are two opposite ends of the case 10. The sliding groove 13 is used for allowing the pushing part 50 to cause the fastening column 40 to move along the groove. The container 14 is used for containing the fastening column 40.

In one embodiment of the present invention, the first pivoting axis 20 is pivotally connected to the bottom 12 and the first hole 111; via the first pivoting axis 20, the case 10 can rotate on the first pivoting axis 20. The second pivoting axis 30 is pivotally connected to the second hole 121. The second pivoting axis 30 includes a fastening groove 31 and an arc surface 32. The fastening groove 31 is located on the arc surface 32. The fastening groove 31 is used for fastening to the fastening column 40. The diameter of the fastening groove 31 is between 5 millimeters and 6 millimeters; in a preferred embodiment, the diameter of the fastening groove 31 is 5.5 millimeters, but the diameter of the fastening groove 31 is not limited to that design and can be changed according to design requirements.

In one embodiment of the present invention, the fastening column 40 is used for fastening to the fastening groove 31 such that the first frame 110 and the second frame 120 are stably combined. The fastening column 40 is located in the container 14. The fastening column 40 includes a fastening column first end 41, a fastening column second end 42, an inclined plane 43 and a fastening hole 44. The fastening column first end 41 and the fastening column second end 42 are two opposite ends, and the inclined plane 43 is located on the fastening column first end 41. The fastening hole 44 is used for connecting to the pushing part 50. The diameter of the fastening column first end 41 is between 4 millimeters and 5 millimeters; in a preferred embodiment, the diameter of the fastening column first end 41 is 4.5 millimeters, but the diameter of the fastening column first end 41 is not limited to that design and can be changed according to design requirements such that it is compatible with the diameter of the fastening groove 31. In the present invention, the diameter of the fastening groove 31 is slightly greater than the diameter of the fastening column first end 41, and a preferred ratio of the diameter of the fastening column first end 41 to the diameter of the fastening groove 31 is between 1:1.2 and 1:1.25, such that the fastening column first end 41 can be fastened to the fastening groove 31 smoothly, without being fastened too tightly or too loosely.

In one embodiment of the present invention, the pushing part 50 is used for being pushed by the user to cause the fastening column 40 to move. The pushing part 50 includes a protruding column 51. The protruding column 51 passes through the sliding groove 13 and is connected to the fastening hole 44. Therefore, when the user pushes the pushing part 50, the protruding column 51 will slide in the sliding groove 13 to cause the fastening column 40 to move.

In one embodiment of the present invention, the connecting column 60 includes a connecting column first end 61, a connecting column second end 62 and a fastener 63. The connecting column first end 61 is connected to the second pivoting axis 30. The third pivoting axis 70 is connected to the connecting column second end 62 and pivotally connected to the top 11. The fastener 63 covers the third pivoting axis 70 and the connecting column second end 62 such that the connection between the third pivoting axis 70 and the connecting column second end 62 is stable. Via the connection between the connecting column 60 and the third pivoting axis 70, and the pivotal connection between the third pivoting axis 70 and the top 11, when the user pushes the case 10 to move the top 11, the movement will cause the connecting column 60 and the third pivoting axis 70 to move, and the moving connecting column 60 will cause the second pivoting axis 30 to rotate.

In one embodiment of the present invention, the elastic part 80 is a spring. The elastic part 80 is located in the container 14 and connected to the fastening column second end 42. The elastic force of the elastic part 80 can push the fastening column 40 to move such that the fastening column 40 moves away from the top 11 in the container 14. However, the type of the elastic part 80 is not limited to a spring; the type can also be another component with elasticity.

When the user wants to fold the folding frame 100 of the present invention to reduce the volume of the folding frame 100, as shown in FIG. 4, the user can cause the second frame 120 to move along the moving direction A on the bicycle pivoting structure 130 such that the second frame 120 can move toward the first frame 110, thereby reducing the volume of the folding frame 100.

If the user wants to combine the second frame 120 with the first frame 110 stably, as shown in FIG. 4 and FIG. 5, the user must cause the second frame 120 to move along the opposite direction of the moving direction A such that the second frame 120 moves to be fastened to the first frame 110; the second frame 120 will then be completely located on the first frame 110 (as shown in FIG. 5). When the second frame 120 moves to be fastened to the first frame 110, the second frame 120 will cause the first pivoting axis 20 and the second pivoting axis 30 to rotate; the rotating second pivoting axis 30 will cause the connecting column 60 to move; the moving connecting column 60 will further cause the case 10 to move along the moving direction B and toward the second frame 120, allowing the inclined plane 43 located in the container 14 of the case 10 to move to be adjacent to the fastening groove 31.

Then, as shown in FIG. 6, after the inclined plane 43 moves to be adjacent to the fastening groove 31, the user can further push the case 10 to cause the case 10 to keep moving along the moving direction B and toward the second frame 120, such that the case 10 will rotate on the first pivoting axis 20 and toward the second frame 120. At this moment, the inclined plane 43 will contact the arc surface 32, and the inclined plane 43 will keep moving with the rotation of the case 10 along the smooth surface of the arc surface 32.

Then, as shown in FIG. 7, when the inclined plane 43 moves with the rotation of the case 10 along the arc surface 32 to align with the fastening groove 31, then via the elastic force of the elastic part 80, the fastening column 40 will be pushed by the elastic part 80, allowing the fastening column first end 41 to move away from the top 11 to enter the fastening groove 31, such that the fastening column 40 will be fastened to the fastening groove 31. At this moment, the second pivoting axis 30 will be affected by the fastening of the fastening column 40 and the fastening groove 31 such that the second pivoting axis 30 cannot rotate; the case 10 is also affected by the fastening of the fastening column 40 and the fastening groove 31 such that it abuts against the fastening position of the first frame 110 and the second frame 120. Therefore, the second frame 120 is limited by the second pivoting axis 30, which is unable to rotate, and the blocking of the case 10, which abuts against the fastening position of the first frame 110 and the second frame 120, such that the second frame 120 cannot rotate to move away from the first frame 110. Therefore, the combination of the first frame 110 and the second frame 120 is stable and the combination cannot easily be uncombined.

As shown in FIG. 3 and FIG. 7, if the user needs to bend the folding frame 100, then the user must release the first frame 110, which is fastened to the second frame 120; to release the first frame 110, the user can press the pushing part 50 toward the top 11. Therefore, the pressing power of the user can offset the elastic force of the elastic part 80 such that the pushing part 50 causes the fastening column 40 to move toward the top 11 and away from the fastening groove 31. When the fastening column 40 moves away from the fastening groove 31, as shown in FIG. 4 and FIG. 5, the user can push the case 10 to cause it to move along the opposite direction of the moving direction B, such that the case 10 will not abut against the fastening position of the first frame 110 and the second frame 120 and block the second frame 120 from moving; therefore, the user can push the second frame 120 to cause the second frame 120 to move along the moving direction A to be bent.

Via the structure of the locking structure 1 of the present invention, the fastening of the fastening column 40 and the fastening groove 31 of the locking structure 1 cause the first frame 110 to be combined with the second frame 120 stably; therefore, when the user rides the folding bicycle with the locking structure 1, the fastening of the first frame 110 and the second frame 120 will not be affected by an uneven road surface and become unfastened. Moreover, because the locking structure 1 is independent of the folding frame 100, then when the user rides the folding bicycle with the locking structure 1 and the folding frame 100 of the present invention, the external shocks caused by an uneven road surface will only affect the locking structure 1, and the external shocks will not affect the folding frame 100. Therefore, if the external shocks caused by the uneven road surface affect any component of the locking structure 1 and cause the component to break, the user needs to replace only the broken component of the locking structure 1; the user does not need to repair the folding frame 100 or buy a new folding frame 100 to replace the broken one, such that the object of reducing the repair cost is achieved.

In summary, regardless of purposes, means and effectiveness, this invention is quite different from the known technology and should merit the issuing of a new patent. However, it is noted that many of the above-mentioned embodiments are only for illustrative purposes; the claims of the invention should depend on the claims and not be limited to the embodiments.

What is claimed is:

1. A locking structure, applied to a folding frame, wherein the folding frame comprises a first frame and a second frame, the first frame is pivotally connected to the second frame, the first frame comprises a first hole, the second frame comprises a second hole, and the second frame can rotate relative to the first frame to move to be fastened to the first frame, the locking structure comprising:

a case, comprising a top, a bottom and a container;

a first pivoting axis, pivotally connected to the bottom and the first hole;

a second pivoting axis, pivotally connected to the second hole, wherein the second pivoting axis comprises a fastening groove;

a fastening column, located in the container;

a connecting column, comprising a connecting column first end and a connecting column second end, wherein the connecting column first end is connected to the second pivoting axis; and a third pivoting axis, connected to the connecting column second end and pivotally connected to the top;

wherein when the second frame moves to be fastened to the first frame, a movement of the second frame causes the second pivoting axis to rotate and the case to move such that the fastening column moves to be adjacent to the fastening groove.

2. The locking structure as claimed in claim 1, wherein the fastening column comprises a fastening column first end, a fastening column second end and an inclined plane; the fastening column first end and the fastening column second end are two opposite ends, and the inclined plane is located on the fastening column first end.

3. The locking structure as claimed in claim 2, further comprising an elastic part, wherein the elastic part is located in the container and connected to the fastening column second end; an elastic force of the elastic part pushes the fastening column such that the fastening column moves away from the top.

4. The locking structure as claimed in claim 3, wherein the second pivoting axis further comprises an arc surface, and the fastening groove is located on the arc surface.

5. The locking structure as claimed in claim 4, wherein when the second frame moves to be fastened to the first frame, the movement of the second frame causes the second pivoting axis to rotate and the case to move such that the inclined plane moves to be adjacent to the fastening groove.

6. The locking structure as claimed in claim 5, wherein when the inclined plane moves to be adjacent to the fastening groove, if the case rotates on the first pivoting axis and toward the second frame, the inclined plane will move along the arc surface.

7. The locking structure as claimed in claim 6, wherein when the inclined plane moves along the arc surface to align with the fastening groove, the elastic force of the elastic part will push the fastening column such that the fastening column first end will move away from the top and enter the fastening groove, causing the fastening column to be fastened to the fastening groove.

8. The locking structure as claimed in claim 7, further comprising a pushing part, the case further comprises a sliding groove, and the pushing part passes through the sliding groove and is connected to the fastening column.

9. The locking structure as claimed in claim 8, wherein the fastening column further comprises a fastening hole, the pushing part further comprises a protruding column, and the protruding column passes through the sliding groove and is connected to the fastening hole.

10. The locking structure as claimed in claim 9, wherein a ratio of a diameter of the fastening column first end to a diameter of the fastening groove is between 1:1.2 and 1:1.25.

11. The locking structure as claimed in claim 1, further comprising a pushing part, the case further comprises a sliding groove, and the pushing part passes through the sliding groove and is connected to the fastening column.

* * * * *